United States Patent [19]

Mase et al.

[11] Patent Number: 5,568,298
[45] Date of Patent: Oct. 22, 1996

[54] FERROELECTRIC LIQUID CRYSTAL BLUE COLOR SHUTTER WITH COLOR CORRECTION FILTER

[75] Inventors: Akira Mase, Aichi-ken; Michio Shimizu, Kanagawa-ken, both of Japan

[73] Assignee: Semiconductor Energy Laboratory Co., Ltd., Kanagawa-ken, Japan

[21] Appl. No.: 162,978

[22] Filed: Dec. 8, 1993

Related U.S. Application Data

[63] Continuation of Ser. No. 811,064, Dec. 20, 1991, abandoned.

[30] Foreign Application Priority Data

Dec. 27, 1990 [JP] Japan .................. 2-418871

[51] Int. Cl.$^6$ .................. G02F 1/141; G02F 1/1335
[52] U.S. Cl. .................. 359/100; 359/66; 359/78
[58] Field of Search .................. 359/56, 39, 100, 359/75, 78, 93, 68, 66; 345/32, 50, 88

[56] References Cited

U.S. PATENT DOCUMENTS

| | | | |
|---|---|---|---|
| 4,586,791 | 5/1986 | Isogai et al. | 359/76 |
| 4,818,074 | 4/1989 | Yokoi et al. | 359/63 |
| 4,924,215 | 5/1990 | Nelson | 359/56 |
| 5,033,825 | 7/1991 | Ishikawa et al. | 359/73 |
| 5,040,877 | 8/1991 | Blinc et al. | 359/63 |
| 5,061,045 | 10/1991 | Yoneya et al. | 359/56 |
| 5,132,826 | 7/1992 | Johnson et al. | 359/56 |

FOREIGN PATENT DOCUMENTS

| | | | |
|---|---|---|---|
| 0009622 | 1/1986 | Japan | 359/67 |
| 63-104020 | 5/1988 | Japan | 359/66 |
| 4-12192 | 1/1990 | Japan | 359/66 |

*Primary Examiner*—William L. Sikes
*Assistant Examiner*—Tai V. Duong
*Attorney, Agent, or Firm*—Sixbey, Friedman, Leedom & Ferguson, P.C.; Gerald J. Ferguson, Jr.

[57] ABSTRACT

An electro-optical device is disclosed. The device comprises a first substrate provided with an electrode and a lead thereon, a second substrate provided with an electrode and a lead thereon, a liquid crystal composition exhibiting ferroelectricity, and a means for orienting the liquid crystal composition at least in its early stage. The liquid crystal composition and the means for orienting the liquid crystal composition at least in its early stage are provided between the first and second substrates, and the product ($\Delta nd$) of the value of the optic anisotropy ($\Delta n$) of the liquid crystal composition and the thickness (d) of the liquid crystal composition is adjusted to 500 to 650 nm.

8 Claims, 4 Drawing Sheets

FERROELECTRIC LIQUID CRYSTAL BLUE COLOR SHUTTER WITH COLOR CORRECTION FILTER

This application is a Continuation of Ser. No. 07/811,064, filed Dec. 20, 1991, now abandoned.

BACKGROUND OF THE INVENTION

1. Field of the Invention

The present invention relates to an electro-optical device, particularly to an optical shutter which is usable for the ON/OFF control of blue light.

2. Description of the Prior Art

In a conventional optical shutter which uses a liquid crystal panel, a chiral smectic liquid crystal composition which exhibits ferroelectricity is mainly used, because the speeds of response of a nematic liquid crystal and a cholesteric liquid crystal are low.

Since the value of the optic anisotropy ($\Delta n$) of the chiral smectic liquid crystal composition which exhibits ferroelectricity is around 0.14, it is necessary to limit the thickness (d) of the liquid crystal composition to about as small as 2 μm in order to uniformly transmit all the three primary colors of light. In this way, it is possible to adjust the product ($\Delta nd$) of the value of the optic anisotropy ($\Delta n$) of the liquid crystal composition and the thickness (d) of the liquid crystal composition to around 280 nm. FIG. 3 shows the spectral property exhibited when the product ($\Delta nd$) is 280 nm.

In case that a liquid crystal device which has such a spectral property is used as a blue color shutter, a blue color filter is provided on an optical path so as to constitute the optical shutter in combination with the liquid crystal device.

A first problem in the conventional optical shutter is that if the thickness (d) of the liquid crystal composition is thin, such a high-grade production technique is required that the liquid crystal panel is difficult to produce.

In the case of producing the liquid crystal device as an optical shutter, since two electrodes are provided opposite to each other between two substrates, when an electrically conductive contaminant is included between the two opposed electrodes, an electrical short circuit occurs, which nullifies the function of the liquid crystal device.

On the other hand, if the thickness (d) of the liquid crystal composition is increased to about 3 μm in order to relieve such a problem, although the production technique becomes easier, the transmittance on the short wavelength side of the visible light region is excessively lowered and the blue color is difficult to transmit.

A second problem is that when the color filter which is attached to the liquid crystal device is blue, the transmittance of blue light is poor.

In case that the liquid crystal device which uniformly transmits the three primary colors of the light is used as a blue color shutter, a blue color filter is provided on the optical path so as to constitute the optical shutter in combination with the liquid crystal device. However, since the blue color filter is poor in transmittance even in the vicinity of the blue color wavelength as shown in the spectral sensitivity in FIG. 4, the blue color filter is unsuitable for the use which needs a large amount of light.

SUMMARY OF THE INVENTION

It is an object of the present invention to eliminate the above-described problems in the prior art and to provide an electro-optical device which is capable of solving the above-described problems in the prior art.

To achieve this aim, the present invention provides a device comprising; a first substrate which is provided with an electrode and a lead thereon; a second substrate which is provided with an electrode and a lead thereon; a liquid crystal composition exhibiting ferroelectricity (a ferroelectric liquid crystal material); and a means for orienting the liquid crystal composition at least in its early stage; the liquid crystal composition and the means for orienting the liquid crystal composition at least in its early stage being provided between the first and second substrates; and the product ($\Delta nd$) of the value of the optic anisotropy ($\Delta n$) of the liquid crystal composition and the thickness (d) of the liquid crystal composition being 500 to 650 nm.

According to the present invention, since the product ($\Delta nd$) of the value of the optic anisotropy ($\Delta n$) of the liquid crystal composition and the thickness (d) of the liquid crystal composition is adjusted to 500 to 650 nm, it is possible to produce an optical shutter which transmits a large amount of blue light by virtue of the birefringence.

The product ($\Delta nd$) of the value of the optic anisotropy ($\Delta n$) and the thickness (d) of the liquid composition is varied from 500 to 650 nm because it is possible to produce a blue color shutter which has a good transmittance by combining the liquid crystal device with a filter which only cuts light on the long wavelength side.

The value of the optic anisotropy ($\Delta n$) in the present invention means the absolute value of the difference between the refractive index of a liquid crystal molecule in the major axial diameter direction and the refractive index of a liquid crystal molecule in the direction which is vertical to the major axial diameter.

The above and other objects, features and advantages of the present invention will become clear from the following description of the preferred embodiment thereof, taken in conjunction with the accompanying drawings.

DESCRIPTION OF THE PREFERRED EMBODIMENTS

Example 1

Figure 1:
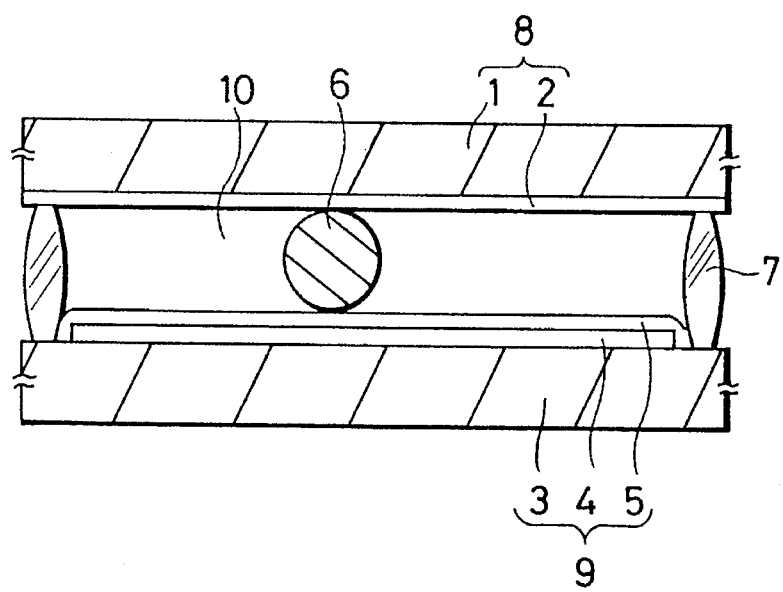
FIG. 1 shows the structure of the section of a liquid crystal electro-optical device according to the present invention.

FIG. 1 shows the structure of the section of a liquid crystal device according to the present invention. 1200 Å of an ITO (indium tin oxide) thin film 2 was first produced on a blue plate glass substrate 1 of 1.1 mm thick by DC sputtering. An electrode and a lead were then formed by photolithography, thereby producing a first substrate 8. Similarly, an electrode and a lead 4 were provided on a glass plate 3 by photolithography. Polyimide 5 was printed thereon to a thickness of 800 Å by offset printing and burned at 380° C. for 30 minutes. The surface of the printed polyimide was rubbed in one direction with a cloth of long staple, thereby providing an orientation control surface for orienting the liquid crystal composition at least in its early stage. Thus, a second substrate 9 was obtained.

An epoxy adhesive 7 was printed on the periphery of the first substrate by screen printing and silica spherical particles 6 having a diameter of 4.2 μm are distributed on the second substrate by spin method at a ratio of 200 particles per mm². Thereafter the first substrate and the second substrate were pasted to each other.

Figure 2:
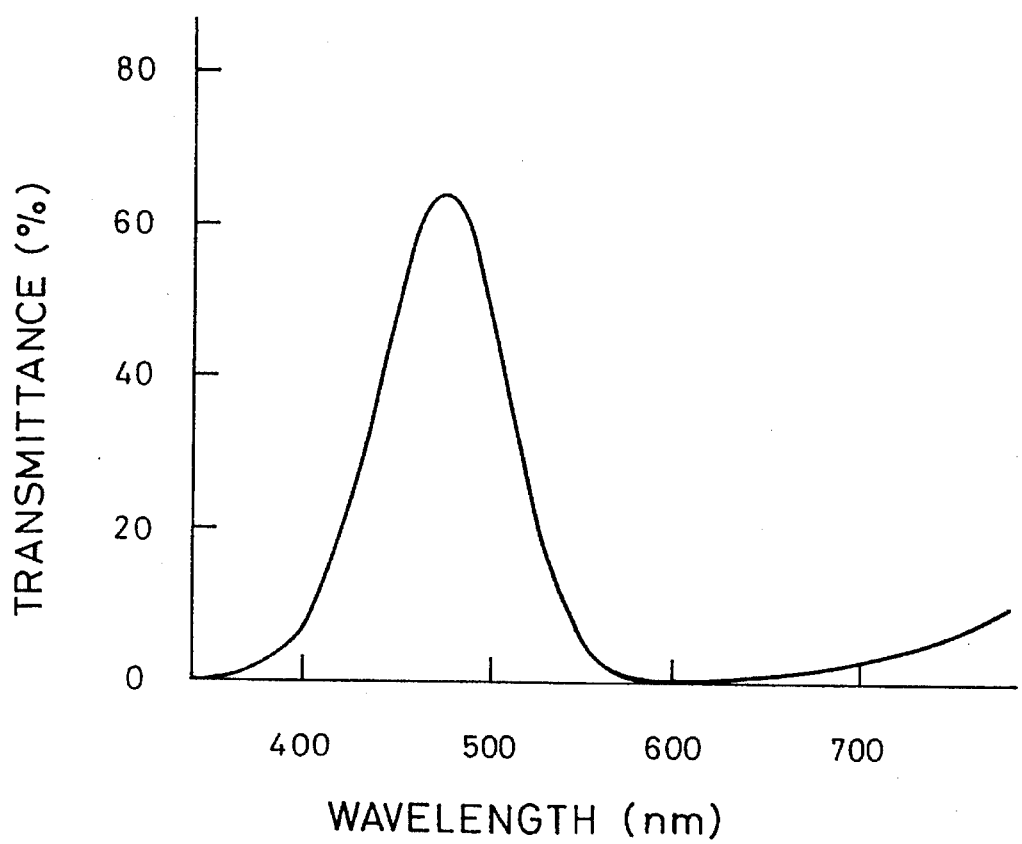
FIG. 2 shows the spectral transmittance of a liquid crystal electro-optical device produced in Example 1.
Figure 3:
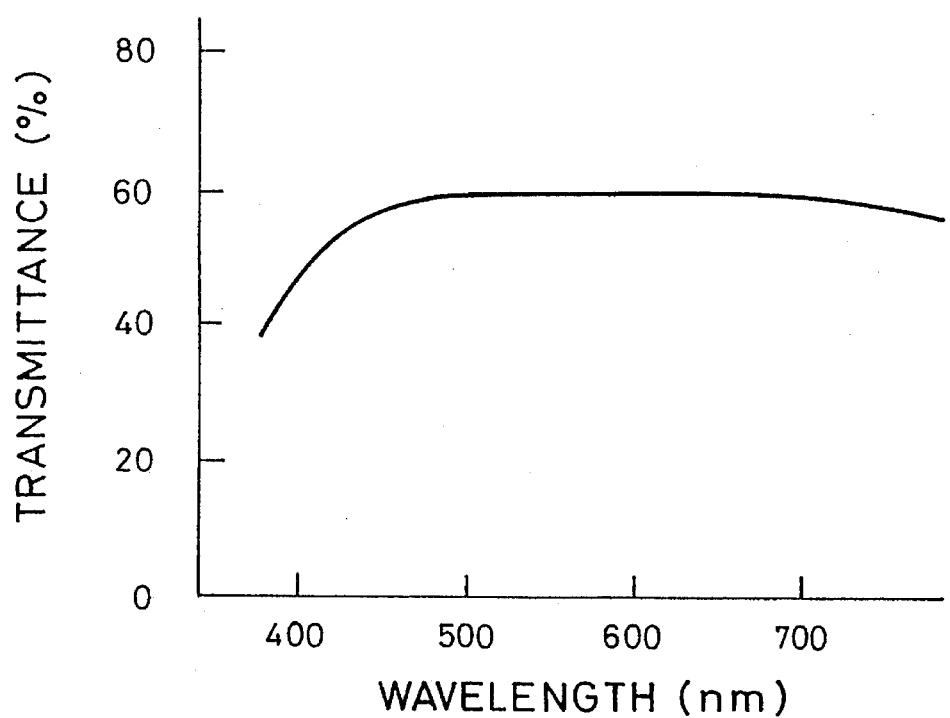
FIG. 3 shows the spectral transmittance of a ferroelectric liquid crystal panel with a product ($\Delta nd$) of 280 nm.
Figure 4:
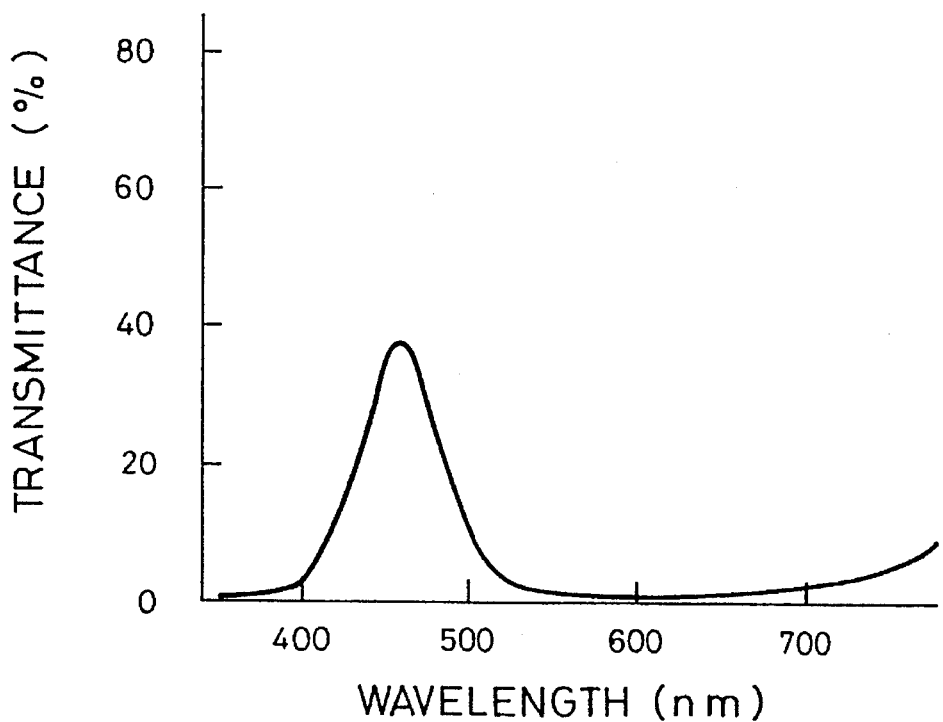
FIG. 4 shows the spectral transmittance of a blue color filter.

The space between the two substrates was charged with a liquid crystal composition 10 which exhibits ferroelectricity. The value of the optic anisotropy ($\Delta n$) of the liquid crystal composition used in the present example was 0.14 and the thickness (d) of the liquid crystal composition was 4.2 m. The product ($\Delta nd$) of the value ($\Delta n$) and the thickness (d) of the liquid crystal composition was therefore 588 nm. FIG. 2 shows the spectral sensitivity of this embodiment. It is obvious from FIG. 2 that an excellent optical blue color shutter is produced without using a filter.

Example 2

Figure 7:
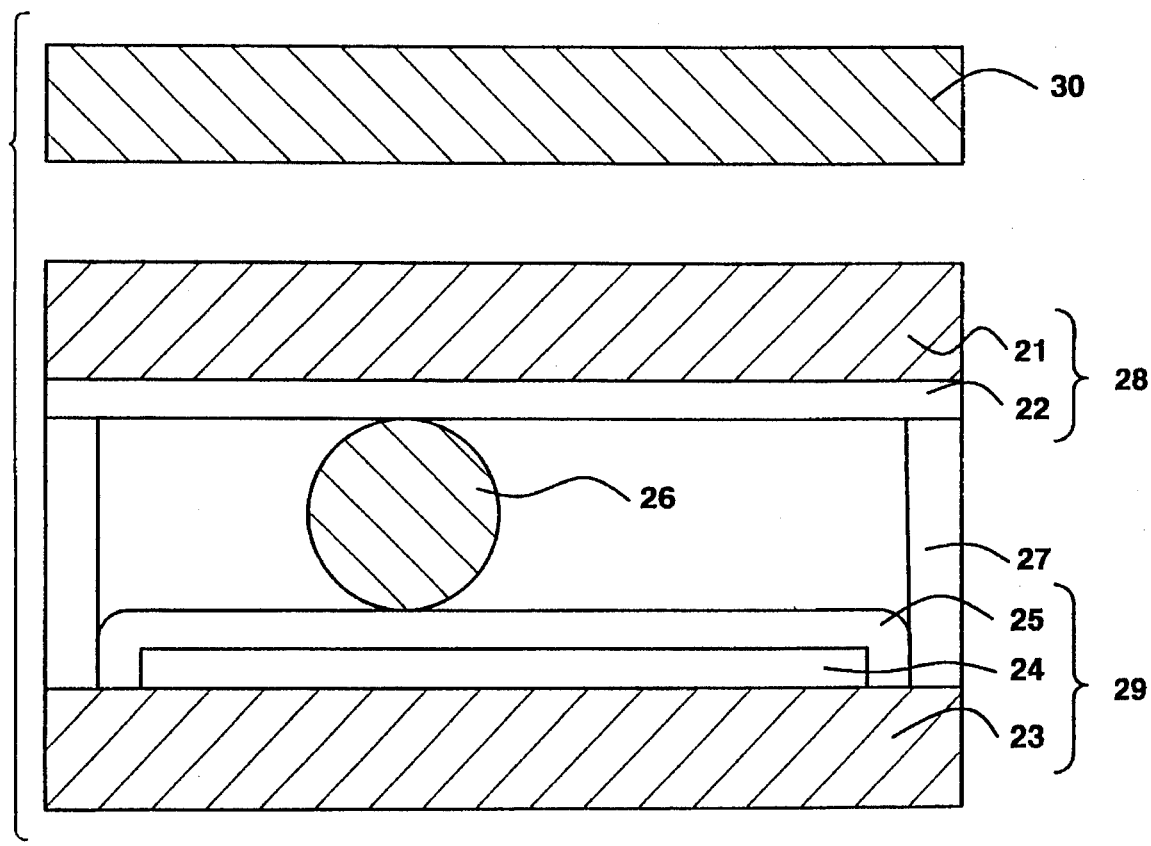
FIG. 7 shows the structure of the section of a liquid crystal electro-optical device formed in accordance with the second example of the present invention.

FIG. 7 shows the structure of the section of a liquid crystal device according to an alternative embodiment of the present invention.

1200 Å of an ITO (indium tin oxide) thin film 22 was produced on a blue plate glass substrate of 1.1 mm thick by DC sputtering. An electrode and a lead were formed on the substrate by photolithography, thereby obtaining a first substrate 28. Similarly, an electrode and a lead 24 were provided on a glass plate 23 by photolithography. Polyimide 25 was printed thereon by offset printing and burned at 380° C. for 30 minutes. The surface of the printed polyimide was rubbed in one direction with a cloth of long staple, thereby providing a means for orienting the liquid crystal composition at least in its early stage. Thus, a second substrate 29 was obtained.

An epoxy adhesive 27 was printed on the periphery of the first substrate by screen printing and silica spherical particles 26 having a diameter of 4.2 μm are distributed on the second substrate by spin method at a ratio of 200 particles per mm². Thereafter the first substrate and the second substrate were pasted to each other.

Figure 5:
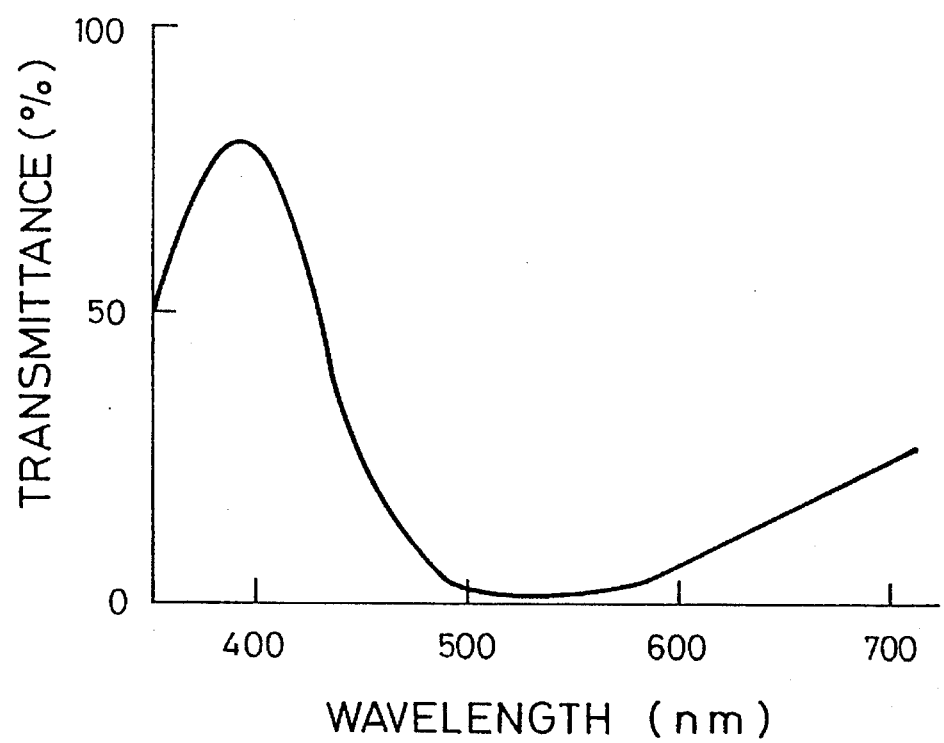
FIG. 5 shows the spectral transmittance of a liquid crystal electro-optical device produced in Example 2.
Figure 6:
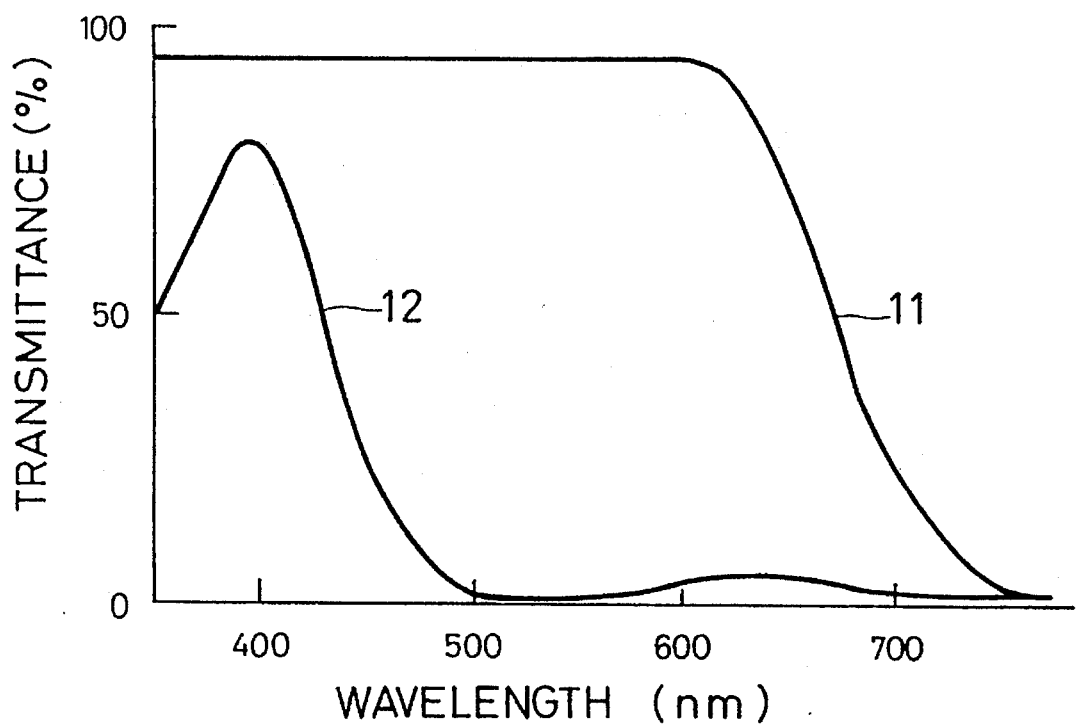
FIG. 6 shows the spectral sensitivity of a cut filter on the long wavelength side used in the second example and the spectral sensitivity of the optical blue color shutter produced.

The space between the two substrates was charged with a liquid crystal composition which exhibits ferroelectricity. The value of the optic anisotropy ($\Delta n$) of the liquid crystal composition used in the present example was 0.13 and the thickness (d) of the liquid crystal composition was 4.0 μm. The product ($\Delta nd$) of the value ($\Delta n$) and the thickness (d) of the liquid crystal composition was therefore 520 nm. FIG. 5 shows the spectral sensitivity of this embodiment. It is obvious from FIG. 5 that since the liquid crystal panel of this example has a good transmittance on the long wavelength side, an optical blue color shutter was produced by combining the liquid crystal panel with a cut filter 30 on the long wavelength side. FIG. 6 shows the spectral sensitivity 11 of the cut filter on the long wavelength side and the spectral sensitivity 12 of the optical blue color shutter produced.

As described above.according to the present invention, an optical shutter which transmits a large amount of blue color by virtue of the birefringence was obtained by adjusting the product ($\Delta nd$) of the value of the optic anisotropy ($\Delta n$) of the liquid crystal composition exhibiting ferroelectricity and the thickness (d) of the liquid crystal composition to 500 to 650 nm. The optical shutter obtained had 2 to 3.5 times as large transmittance as the conventional optical blue color shutter which was obtained by combining a liquid crystal cell with the product ($\Delta nd$) adjusted to around 280 nm with a blue color filter.

The foregoing description of preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application thereby to enable others in the art to utilize most effectively the invention in various embodiments and with various modifications as are suited to the particular use contemplated.

What is claimed is:

1. An electro-optical blue color shutter comprising:

a pair of substrates provided with electrodes thereon;

an orientation control surface provided on an inside surface of only one of said substrates;

a ferroelectric liquid crystal material disposed between said substrates wherein the product ($\Delta nd$) of the optical anisotropy ($\Delta n$) of said ferroelectfic liquid crystal material and the thickness (d) of said ferroelectfic liquid crystal material in a direction perpendicular to said inside surface is 500 nm to 650 nm; and a filter which cuts only the light of long wavelengths.

2. An electro-optical blue color shutter comprising:

a pair of substrates provided with electrodes thereon;

an orientation control surface provided on an inside surface of only one of said substrates;

a ferroelectric liquid crystal material disposed between said substrates wherein the product ($\Delta nd$) of the optical anisotropy ($\Delta n$) of said ferroelectric liquid crystal material and the thickness (d) of said ferroelectric liquid crystal material in a direction perpendicular to said inside surface is 500 nm to 650 nm; and a filter which cuts only the light of wavelengths longer than 600 nm.

3. The shutter of claims 1 or 2 wherein said orientation control surface is a surface of a polyimide film provided on said one of said substrates.

4. The shutter of claim 3 wherein said surface of a polyimide film is rubbed, 5. The shutter of claims 1 or 2 wherein said electrodes comprise indium tin oxide.

6. The shutter of claims 1 or 2 further comprising spacers distributed between said substrates.

7. The shutter of claims 1 or 2 wherein each of said substrates are glass substrates.

8. The blue color shutter of claims 1 or 2 wherein said shutter is not provided with a blue color filter.

* * * * *